United States Patent
Guo et al.

(10) Patent No.: US 12,197,008 B2
(45) Date of Patent: Jan. 14, 2025

(54) COMMUNICATION SYSTEM

(71) Applicant: HUAWEI TECHNOLOGIES CO., LTD., Guangdong (CN)

(72) Inventors: Qiang Guo, Shenzhen (CN); Rui Zhou, Shenzhen (CN); Zhiqun Yang, Tianjin (CN); Lin Zhang, Tianjin (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 17/854,585

(22) Filed: Jun. 30, 2022

(65) Prior Publication Data
US 2022/0342151 A1    Oct. 27, 2022

Related U.S. Application Data

(63) Continuation of application No. PCT/CN2020/138718, filed on Dec. 23, 2020.

(30) Foreign Application Priority Data

Dec. 31, 2019   (CN) .......................... 201911417874.6

(51) Int. Cl.
*G02B 6/14* (2006.01)
*H04J 14/04* (2006.01)

(52) U.S. Cl.
CPC ................ *G02B 6/14* (2013.01); *H04J 14/04* (2013.01)

(58) Field of Classification Search
CPC .... G02B 6/02047; G02B 6/0288; G02B 6/14; H04B 10/2581; H04J 14/04
See application file for complete search history.

(56) References Cited

U.S. PATENT DOCUMENTS 3,666,348 A * 5/1972 Marcatili ................. G02B 6/14
                                                     65/276
3,759,590 A * 9/1973 Arnaud .................... G02B 6/10
                                                    359/619
(Continued)

FOREIGN PATENT DOCUMENTS

CN        104067152 A      9/2014
CN        104205693 A     12/2014
(Continued)

OTHER PUBLICATIONS

Z. Wu et al. Reconfigurable all-fiber pre and post mode exchange for short-reach MDM networks. 2017 Asia Communications and Photonics Conference, paper M1C.7, pp. 1-3, Nov. 2017 (https://doi.org/10.1364/ACPC.2017.M1C.7) (Year: 2017).*
(Continued)

*Primary Examiner* — Michael Stahl
(74) *Attorney, Agent, or Firm* — Fish & Richardson P.C.

(57) ABSTRACT

A communication system is provided. The communication system may include few mode fibers of at least two spans and a mode converter. The few mode fiber is configured to transmit M received mode groups, where group delays of the M mode groups during transmission in the few mode fiber are symmetrically distributed about a center. The mode converter is configured to: receive the M mode groups from the few mode fiber, perform mode group exchange between a first mode group and a second mode group in the M mode groups to obtain M exchanged mode groups, where a group delay of the first mode group and a group delay of the second mode group are symmetric about the center.

17 Claims, 10 Drawing Sheets

(56) References Cited

U.S. PATENT DOCUMENTS

| | | | | | |
|---|---|---|---|---|---|
| 3,832,030 | A | * | 8/1974 | Gloge | G02B 6/268 |
| | | | | | 385/39 |
| 10,277,354 | B1 | * | 4/2019 | Li | G02B 6/02042 |
| 2004/0202423 | A1 | * | 10/2004 | White | G02B 6/03694 |
| | | | | | 385/39 |
| 2014/0093205 | A1 | * | 4/2014 | Gruner-Nielsen | |
| | | | | | G02B 6/03633 |
| | | | | | 385/123 |
| 2014/0126915 | A1 | | 5/2014 | Gruner-Nielsen et al. | |
| 2015/0003772 | A1 | | 1/2015 | Lionello | |
| 2015/0168643 | A1 | * | 6/2015 | Gruner-Nielsen | G02B 6/0288 |
| | | | | | 385/124 |
| 2015/0192733 | A1 | * | 7/2015 | Abedin | G02B 6/02071 |
| | | | | | 385/28 |
| 2018/0175937 | A1 | * | 6/2018 | Yang | H04B 10/2581 |
| 2019/0187365 | A1 | * | 6/2019 | Urushibara | G02B 6/14 |

FOREIGN PATENT DOCUMENTS

| | | | |
|---|---|---|---|
| CN | 106712850 | A | 5/2017 |
| CN | 110501783 | A | 11/2019 |
| JP | 2014527301 | A | 10/2014 |
| JP | 2016082318 | A | 5/2016 |
| JP | 2017050820 | A | 3/2017 |
| JP | 2019154004 | A | 9/2019 |
| WO | WO 2017/158262 A1 | * | 9/2017 |

OTHER PUBLICATIONS

Extended European search report for application 20910532.9, dated May 15, 2023. (Year: 2023).*

T. Mori et al. Few-mode fiber technology for mode division multiplexing. Optical Fiber Technology, 35, Feb. 2017 (https://doi.org/10.1016/j.yofte.2016.07.011) (Year: 2017).*

Y. Zhao et al. All-fiber mode converter based on long-period fiber gratings written in few-mode fiber. Optics Letters, 42:22, Nov. 2017 (https://doi.org/10.1364/OL.42.004708) (Year: 2017).*

Shibahara et al., "DMD-Unmanaged Long-Haul SDM Transmission Over 2500-km 12-Core x 3-Mode MC-FMF and 6300-km 3-Mode FMF Employing Intermodal Interference Canceling Technique," Journal of Lightwave Technology, vol. 37, No. 1, Jan. 1, 2019, 10 pages.

Sakamoto et al., "Differential Mode Delay Managed Transmission Line for WDM-MIMO System Using Multi-Step Index Fiber," Journal of Lightwave Technology, vol. 30, No. 17, Sep. 1, 2012, 5 pages.

Liu et al., "Reducing Group Delay Spread Using Uniform Long-Period Gratings," Scientific Reports, Mar. 1, 2018, 8 pages.

International Search Report and Written Opinion in International Appln. No. PCT/CN2020/138718, mailed on Mar. 30, 2021, 13 pages (with English translation).

Office Action in Japanese Appln. No. 2022-540507, mailed on Oct. 3, 2023, 9 pages (with English translation).

Extended European Search Report in European Appln No. 20910532.9, dated May 15, 2023, 9 pages.

* cited by examiner

COMMUNICATION SYSTEM

CROSS-REFERENCE TO RELATED APPLICATIONS

[0001] This application is a continuation of International Application No. PCT/CN2020/138718, filed on Dec. 23, 2020, which claims priority to Chinese Patent Application No. 201911417874.6, filed on Dec. 31, 2019. The disclosures of the aforementioned applications are hereby incorporated by reference in their entireties.

TECHNICAL FIELD

This application relates to the field of communication technologies, and in particular, to a communication system.

BACKGROUND

With development of fiber communication technologies, a single mode fiber communication system cannot meet an increasing communication capacity requirement. A multimode fiber is proposed. Although the multimode fiber can meet a communication capacity requirement (can support 100 to 200 modes), inter-mode dispersion is severe, causing relatively severe signal distortion. Therefore, few mode fiber communication emerges as the times require. A few mode fiber can reduce inter-mode dispersion, and can also improve a capacity of a communication system. Therefore, the few mode fiber is widely used in a fiber communication system.

In the fiber communication system, crosstalk occurs between signals carried in different modes in a transmission process. Therefore, a receive end needs to demodulate, by using a multiple-input multiple-output (MIMO) algorithm, signals carried in different modes. Complexity of the MIMO algorithm is positively correlated with a differential mode group delay (DMGD) between the modes. That is, a larger DMGD between the modes indicates a more complex MIMO algorithm, causing longer signal demodulation time of the receive end. Consequently, signal demodulation real-time performance of the receive end is relatively poor.

To reduce signal demodulation complexity of the receive end, in the conventional technology, a positive/negative mode dispersion few mode fiber is usually cascaded behind a few mode fiber of each span, to reduce a DMGD. However, a preparation process of the positive/negative mode dispersion few mode fiber is complex, and the few mode fiber is difficult to match the positive/negative mode dispersion few mode fiber, causing a relatively difficult cascading process.

SUMMARY

This application provides a communication system, to reduce group delays of different mode groups during arrival at a receive end.

According to a first aspect, this application provides a communication system. The communication system may include few mode fibers of at least two spans and a mode converter. The few mode fiber is configured to transmit M received mode groups, where group delays of the M mode groups during transmission in the few mode fiber are symmetrically distributed about a center, the center of the group delays of the M mode groups is a median value between a largest value and a smallest value of the group delays of the M mode groups, a signal is carried in each of the M mode groups, and M is an integer greater than 1. The mode converter is configured to: receive the M mode groups from the few mode fiber, perform mode group exchange between a first mode group and a second mode group in the M mode groups to obtain M exchanged mode groups, and couple the M exchanged mode groups to a few mode fiber of a next span, where a group delay of the first mode group and a group delay of the second mode group are symmetric about the center, and the first mode group and the second mode group are at least two of the M mode groups.

Based on this solution, the M mode groups are transmitted by using the few mode fiber. When the M mode groups reach the end of the few mode fiber, the group delays of the M mode groups are symmetrically distributed about the center. The M mode groups whose group delays are symmetrically distributed about the center enter the mode converter. The mode converter exchanges the first mode group and the second mode group that are symmetric about the center. For example, a mode group whose group delay is the largest value is exchanged with a mode group whose group delay is the smallest value, a mode group whose group delay is a second largest value is exchanged with a mode group whose group delay is a second smallest value, and so on. The M exchanged mode groups are further coupled to the few mode fiber of the next span for transmission. During transmission in the few mode fiber of the next span, the mode group whose group delay is the largest value is changed to the mode group whose group delay is the smallest value, the mode group whose group delay is the smallest value is changed to the mode group whose group delay is the largest value, and so on. When the M mode groups arrive at the end of the few mode fiber of the next span, the group delays of the M mode groups are zero, thereby helping reduce complexity of a MIMO algorithm of a receive end.

In a possible implementation, all pairs each including a first mode group and a second mode group that are in the M mode groups and whose group delays are symmetric about the center are equal in group delay sum. Further, optionally, when M is an even number, the M group delays include M/2 pairs of group delays symmetric about the center, that is, the M mode groups include M/2 first mode groups and M/2 second mode groups. When M is an odd number, the M group delays include $\lfloor M/2 \rfloor$ pairs of group delays symmetric about the center, that is, the M mode groups include $\lfloor M/2 \rfloor$ first mode groups, $\lfloor M/2 \rfloor$ second mode groups, and one independent mode group.

In a possible implementation, the few mode fiber sequentially includes a core, inner cladding, a trench, and outer cladding from the inside to the outside. Group refractive indexes of the M mode groups are symmetrically distributed about a center in the few mode fiber. A group refractive index of each of the M mode groups is determined based on an effective refractive index of the mode group, and the effective refractive index of the mode group is determined based on a refractive index of the core, a refractive index of the inner cladding, a refractive index of the outer cladding, a refractive index of the trench, a radius of the core, a width of the inner cladding, a width of the trench, and a width of the outer cladding of the few mode fiber.

To exchange the first mode group and the second mode group that are in the M mode groups and whose group delays are symmetric about the center, the mode converter may include fiber gratings of $\lfloor M/2 \rfloor$ different periods, one period corresponds to one first mode group and one second mode group, and $\lfloor \ \rfloor$ indicates rounding down. Each of the $\lfloor M/2 \rfloor$ different periods is determined based on a communication wavelength, an effective refractive index of a corresponding first mode group, and an effective refractive index of a corresponding second mode group.

Further, optionally, a difference that is between the effective refractive index of the first mode group corresponding to the grating period and the effective refractive index of the second mode group corresponding to the grating period and that is multiplied by the grating period is equal to the communication wavelength.

In a possible implementation, the fiber gratings of the $\lfloor M/2 \rfloor$ different periods may be of a cascaded structure, or may be of a stacked structure. When the fiber gratings of the $\lfloor M/2 \rfloor$ different periods are of the stacked structure, it helps avoid impact of cross sections of fiber gratings of different regions on coupling of other mode groups with unmatched phases.

In a possible implementation, the mode converter may include a reflective phase plate or a transmissive phase plate.

In this application, the communication system further includes an amplifier. The mode converter may be located between the few mode fiber and the amplifier; or the mode converter may be integrated into the amplifier. Integrating the mode converter into the amplifier can compensate for an insertion loss introduced by the mode converter without deteriorating a signal-to-noise ratio of signal transmission.

DESCRIPTION OF EMBODIMENTS

Figure 1:
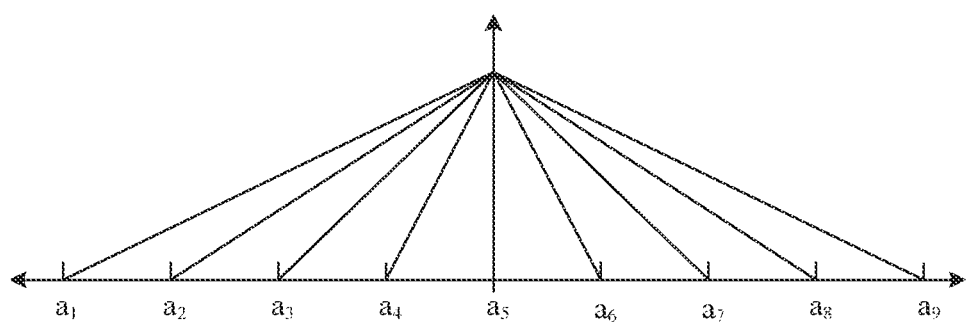
FIG. 1 is a schematic diagram of values symmetrically distributed about a center according to this application.

The following describes some terms in s application, to help a person skilled in the art understand this application.
1. Few Mode Fiber (FMF)

The FMF is a single core fiber, has a relatively large mode field area, and allows a plurality of independent modes to transmit signals in parallel. Usually, the few mode fiber can support 2 to 50 modes. That is, the few mode fiber is a fiber that has a relatively large core area and supports parallel signal transmission in a plurality of modes. The mode may be understood as a field distribution form formed when light is transmitted in a fiber as an electromagnetic wave. That is, light travels in the few mode fiber to form a hybrid mode, and the hybrid mode is usually referred to as a linearly polarized (LP) mode.

The few mode fiber transmits signals based on a mode division multiplexing technology. Ideally, different modes are mutually orthogonal. It may also be understood that the few mode fiber can support a plurality of mutually orthogonal independent modes, these modes are used as independent channels, and these modes may simultaneously carry a plurality of signals.

2. Mode Group

The mode group is a group including a plurality of modes that are consistent in propagation constant. That is, a plurality of modes included in one mode group are equal in group velocity. One fiber can transmit a plurality of mode groups.

3. Differential Mode Group Delay (DMGD)

Mode groups transmitted in a few mode fiber have different effective refractive indexes. Because v=c/n, that is, different mode groups are transmitted in the few mode fiber at different velocities, a delay difference generated between the mode groups after the different mode groups are transmitted by a distance in the few mode fiber is a DMGD, and a mathematical expression is as follows:

$$\tau = \frac{1}{v_g} = \frac{1}{c}\frac{d\beta}{dk_0} = -\frac{\lambda^2}{2\pi c}\frac{d\beta}{d\lambda},$$

where $\lambda$ represents a communication wavelength, $v_g$ represents a group velocity, c represents a speed of light in a vacuum, an optical signal propagation constant $\beta = n_{eff} * k_0$, $k_0 = 2\pi/\lambda$ and represents propagation constant of a light wave present in an open free space, and $n_{eff}$ represents an effective refractive index of this mode group.

4. Effective Refractive Index $n_{eff}$

The effective refractive index is a quantity that can quantitatively describe a unit-length phase delay in a waveguide (for example, a few mode fiber), and is relative to a unit-length phase delay in a vacuum. In a homogeneous transparent medium, a refractive index n can be used to quantitatively describe a degree to which a wave quantity (a unit-length phase delay) increases due to the medium: The wave quantity in the medium is n times a wave quantity in the vacuum. The effective refractive index $n_{eff}$ has a similar meaning: In a waveguide (for example, a few mode fiber), a β value of a wavelength is $n_{eff}$ times the wave quantity in the vacuum, where $$\beta = n_{eff} * k_0 = n_{eff} * \frac{2\pi}{\lambda}.$$

It should be noted that the effective refractive index further depends on a transmission mode in addition to a wavelength. Therefore, the effective refractive index is also referred to as a mode refractive index.

5. Refractive Index Profile

The refractive index profile indicates a relationship between a refractive index or a relative refractive index and a radius of a fiber. For example, n(r) represents a refractive index at a radius r.

6. Relative Refractive Index Difference

The relative refractive index difference indicates a ratio of a difference between two refractive indexes to a relative refractive index. For example, a relative refractive index difference between a trench and outer cladding is $\Delta n_{TR}$, and $\Delta n_{TR}=(n_{TR}-n_{CL})/n_{CL}$, where $n_{CL}$ represents a refractive index of the outer cladding, and $n_{TR}$ represents a refractive index of the trench.

7. Symmetric Distribution about a Center

On a number axis, it is customary to mutually refer to two value points equidistant from an origin 0 in opposite directions as symmetric points. For example, 7 and −7 are mutually referred to as points symmetric about a center. A sum of values of two symmetric points centered around 0 is 0. In a symmetric point interval [−a, +a] centered around the point 0, 0 is not included, there are 2a effective points, and a maximum of a pairs of symmetric points may be formed.

M values are arranged in ascending order or descending order, and all pairs of values equidistant from a center are equal in sum. This pair of values are referred to as symmetric about the center. FIG. 1 is a schematic diagram of values symmetrically distributed about a center according to this application. For example, M=9. M values are sequentially arranged as {$a_1$, $a_2$, $a_3$, $a_4$, $a_6$, $a_7$, $a_8$, $a_9$}, a center value of the M values is $a_5(a_1+a_9)/2$, $a_1$ and $a_9$ are equidistant from the center, $a_2$ and $a_8$ are equidistant from the center, $a_3$ and $a_7$ are equidistant from the center, and $a_4$ and $a_6$ are equidistant from the center. In addition, $a_1+a_9=a_2+a_8=a_3+a_7=a_4+a_6=2a_5$. Therefore, $a_1$ and $a_9$ are symmetric about the center, $a_2$ and $a_8$ are symmetric about the center, $a_3$ and $a_7$ are symmetric about the center, and $a_4$ and $a_6$ are symmetric about the center.

It may also be understood that, in M values symmetrically distributed about a center, a largest value and a smallest value are equidistant from the center, a second largest value and a second smallest value are also equidistant from the center, and a sum of the largest value and the smallest value is equal to a sum of the second largest value and the second smallest value; and so on.

In a communication system of a few mode fiber that is based on mode division multiplexing, orthogonal modes supported by the few mode fiber are used as independent channels for parallel signal transmission, thereby improving a transmission capacity of the communication system. In addition, because the modes of the few mode fiber have a relatively large mode field area, a non-linear tolerance is also high. That is, a communication system including a few mode fiber can improve a transmission capacity of the communication system, and also help avoid interference caused by a non-linear effect to the system, but the problem described in the background exists.

In view of the technical problem in the background, this application proposes a communication system. The communication system can reduce group delays of different mode groups in the communication system, to help reduce complexity of a MIMO algorithm of a receive end, and improve transmission system efficiency.

Figure 2:
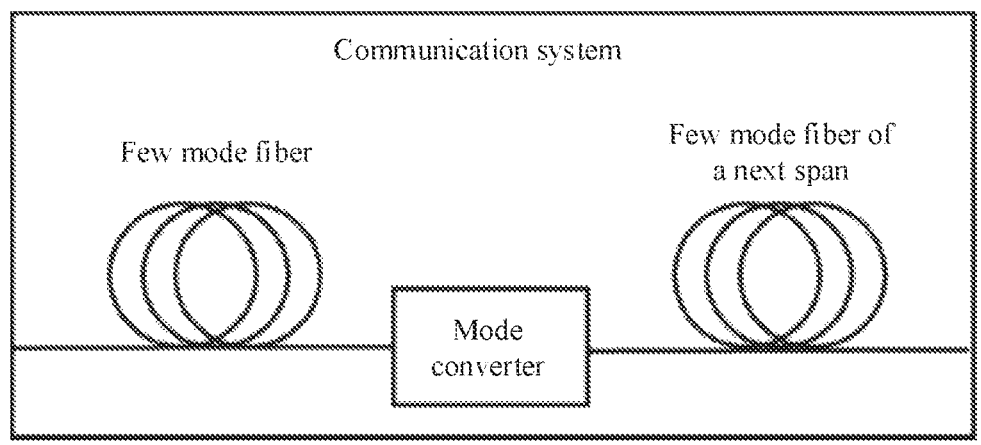
FIG. 2 is a schematic diagram of an architecture of a communication system according to this application.

With reference to FIG. 2 to FIG. 9, the following describes in detail the communication system proposed in this application, FIG. 2 is a schematic diagram of an architecture of a communication system according to this application. The communication system may include few mode fibers of at least two spans and a mode converter. FIG. 2 shows an example in which few mode fibers of two spans and one mode converter are included. The few mode fiber is configured to transmit M received mode groups. Group delays of the M mode groups during transmission in the few mode fiber are symmetrically distributed about a center. The mode converter is configured to: receive the M node groups from the few mode fiber, perform mode group exchange between a first mode group and a second mode group in the M mode groups to obtain M exchanged mode groups, and couple the M exchanged mode groups to a few mode fiber of a next span. A group delay of the first mode group and a group delay of the second mode group are symmetric about the center, the first mode group and the second mode group are at least two of the M mode groups, the center of the group delays of the M mode groups is a median value between a largest value and a smallest value of the group delays of the M mode groups, a signal is carried in each of the M mode groups, and M is an integer greater than 1.

In this application, each of the M mode groups corresponds to one group delay, and the M mode groups correspond to M group delays. The M group delays are respectively $t_1$, $t_2$, ..., $t_{M-1}$, and $t_M$, where $t_1 > t_2 > ... > t_M$. If $t_1, t_2, ..., t_{M-1}$, and $t_M$ are symmetrically distributed about a center, $t_1+t_M=t_2+t_{M-1}=...$, that is, $t_1$ and $t_M$ are symmetric about the center, $t_2$ and $t_{M-1}$ are symmetric about the center, and so on. Correspondingly, one of a mode group corresponding to $t_1$ and a mode group corresponding to $t_M$ is a first mode group, and the other mode group is a second mode group; and one of a mode group corresponding to $t_2$ and a mode group corresponding to $t_{M-1}$ is a first mode group, and the other anode group is a second anode group. For example, the mode group corresponding to $t_1$ is the first mode group, and the mode group corresponding to $t_M$ is the second mode group; the mode group corresponding to $t_2$ is the first mode group, and the mode group corresponding to $t_{M-1}$ is the second mode group; and so on. For another example, the mode group corresponding to $t_1$ is the second mode group, and the mode group corresponding to $t_M$ is the first mode group; the mode group corresponding to $t_2$ is the second mode group, and the mode group corresponding $t_{M-1}$ is the first mode group; and so on. It should be understood that the mode converter is configured to: convert the first mode group into the second mode group, and convert the second mode group into the first mode group. That is, the mode converter is configured to: gradually convert a mode field of the first mode group into a mode field of the second mode group, and gradually convert the mode field of the second mode group into the mode field of the first mode group, In a possible implementation, one mode converter is included between few mode fibers of every two spans in the few mode fibers of the at least two spans, that is, a few mode fiber of a span+a mode converter+a mode converter of a next span. It should be noted that the few mode fibers of the at least two spans may be few mode fibers of spans whose quantity is an even number, or may be few mode fibers of spans whose quantity is an odd number. When the few mode fibers of the at least two spans are few mode fibers of spans whose quantity is an even number, after the M mode groups pass through a few mode fiber of a span+a mode converter+a mode converter of a next span, the group delays of the M groups may be zero. When the few mode fibers of the at least two spans are few mode fibers of spans whose quantity is an odd number, the group delays of the M mode groups may be group delays in a few mode fiber of the last span.

Based on the communication system shown in FIG. 2, the M mode groups are transmitted by using the few mode fiber. When the M mode groups reach the end of the few mode fiber, the group delays of the M mode groups are symmetrically distributed about the center. The M mode groups whose group delays are symmetrically distributed about the center enter the mode converter. The mode converter exchanges the first mode group and the second mode group that are symmetric about the center. For example, a mode group whose group delay is the largest value is exchanged with a mode group whose group delay is the smallest value, a mode group whose group delay is a second largest value is exchanged with a mode group whose group delay is a second smallest value, and so on. The M exchanged mode groups are further coupled to the few mode fiber of the next span for transmission. During transmission in the few mode fiber of the next span, the mode group whose group delay is the largest value is changed to the mode group whose group delay is the smallest value, the mode group whose group delay is the smallest value is changed to the mode group whose group delay is the largest value, and so on. When the M mode groups arrive at the end of the few mode fiber of the next span, the group delays of the M mode groups are zero, thereby helping reduce complexity of a. MIMO algorithm of a receive end.

The following separately describes the structures shown in FIG. 2, to provide example specific implementation solutions.

1. Few Mode Fiber

Figure 3:
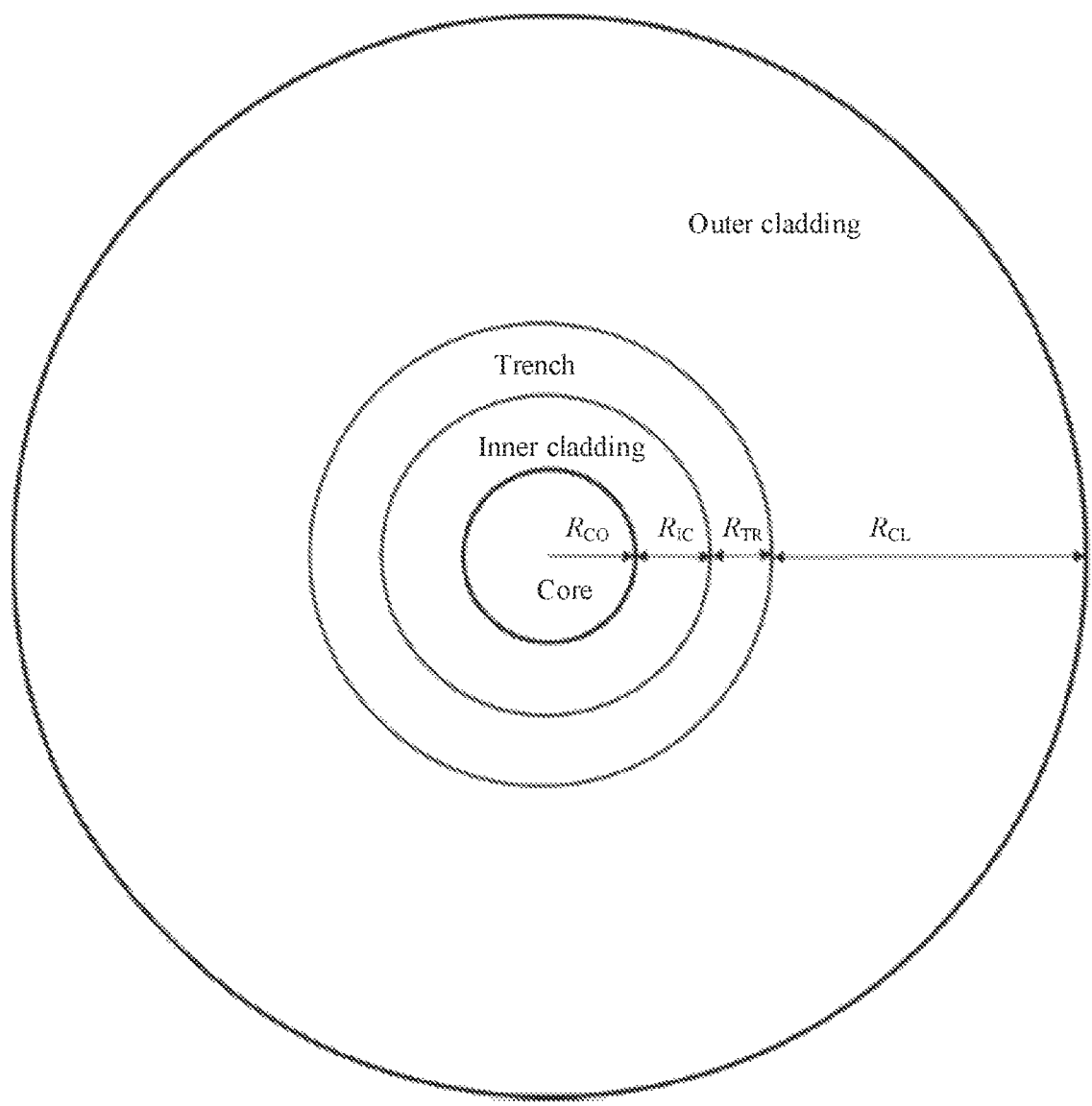
FIG. 3 is a schematic diagram of a structure of a cross section of a few mode fiber according to this application.

In this application, the few mode fiber may sequentially include a core, inner cladding (inner cladding), a trench (trench), and outer cladding (outer cladding). FIG. 3 is a schematic diagram of a structure of a cross section of a few mode fiber according to this application. The few mode fiber includes a core and cladding. The cladding is a layer of glass or another transparent material that covers the outside of the core that carries a light wave, and has a slightly lower refractive index than the core and therefore can limit light to being transmitted in the core. The cladding includes inner cladding and outer cladding. The inner cladding of the few mode fiber in FIG. 3 is an annular structure wrapping the core, a structure surrounding the inner cladding is a trench (also referred to as a recessed layer), and an outermost annular structure is the outer cladding.

Few mode fibers may be classified into a step-index (step-index) few mode fiber and a graded-index (graded-index) few mode fiber based on refractive index profiles. The following separately describes, in detail based on the step-index few mode fiber and the graded-index few mode fiber, implementations in which group delays of M mode groups during transmission in the two types of few mode fibers are symmetrically distributed about a center.

In a possible implementation, in order that the group delays of the M mode groups during transmission in the few mode fiber are symmetrically distributed about the center, parameters of the few mode fiber, such as a refractive index profile, a radius of the core, a width of the trench, a width of the inner cladding, and a width of the outer cladding of the few mode fiber, may be designed.

Type 1. Step-Index Few Mode Fiber

Figure 4A:
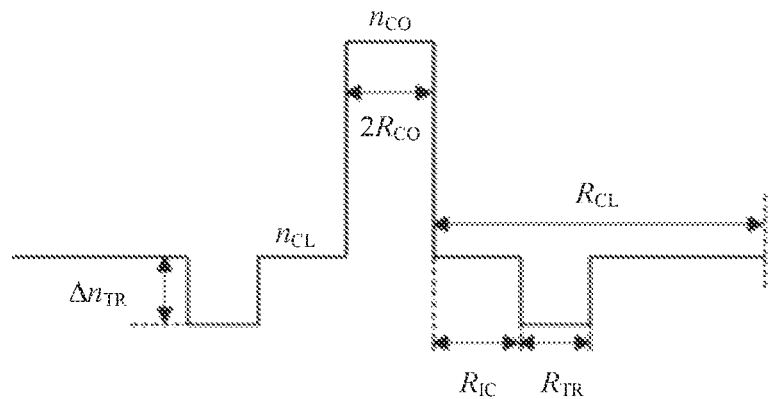
FIG. 4a is a schematic diagram of a structure of a step-index few mode fiber according to this application.

FIG. 4a is a schematic diagram of a structure of a step-index few mode fiber according to this application. A refractive index profile function of the step-index few mode fiber is as follows:

$$n(r) = \begin{cases} n_{CO}(r) & 0 < r \leq R_{CO} \\ n_{IC} & R_{CO} < r \leq R_{CO} + R_{IC} \\ \frac{n_{CL}}{1 - \Delta n_{TR}} & R_{CO} + R_{IC} < r \leq R_{CO} + R_{IC} + R_{TR} \\ n_{CL} & R_{CO} + R_{IC} + R_{TR} < r \leq R_{CL} \end{cases},$$

where $n_{CO}$ represents a refractive index of a core, $n_{IC}$ represents a refractive index of inner cladding, $n_{CL}$ represents a refractive index of outer cladding, $$\frac{n_{CL}}{1 - \Delta n_{TR}}$$

represents a refractive index of a trench, $\Delta n_{TR}$ represents a relative refractive index difference between the trench and the outer cladding, $\Delta n_{TR}=(n_{TR}-n_{CL})/n_{CL}$, $R_{CO}$ represents a radius of the core, $R_{IC}$ represents a width of the inner cladding, $R_{TR}$ represents a width of the trench, and $R_{CL}$ represents a width of the outer cladding, it should be understood that the trench is a trench dug between the inner cladding and the outer cladding, and therefore $n_{IC}=n_{CL}$.

In this application, a quantity of mode groups transmitted by the few mode fiber is M, and a corresponding normalized frequency parameter is V. Ranges of parameters of the few mode fiber may be determined by using the following relationships:

$$V = 2\pi R_{CO} NA / \lambda; \text{ and } NA = \sqrt[2]{n_{CO}^2 - n_{CL}^2},$$

where

NA represents a numerical aperture, and λ represents a communication wavelength and is also referred to as an operating wavelength. It should be noted that NA is an empirical value, and has a value range of 0.12±0.02. To ensure that the few mode fiber has a relatively high non-linear power threshold, a relatively large mode field area is required. Therefore, a relatively large core radius is required. A corresponding numerical aperture is also relatively large, and NA may be 0.14. In addition, a value range of λ may be 1.5 µm to 1.6 µm.

Further, a material of the outer cladding is mainly silicon dioxide. When λ=1.55 µm, a corresponding refractive index is 1.4444. Because a process error or the like may exist in a preparation process of the few mode fiber, the refractive index of the outer cladding usually has an error of ±0.006. To be specific, $1.4444-0.006 \leq n_{CL} \leq 1.4444+0.006$, $n_{CO}$ may be determined according to $$NA = \sqrt[2]{n_{CO}^2 - n_{CL}^2}.$$

$\Delta n_{TR}$ is an empirical value and has a value range of $-0.0045 \leq \Delta n_{TR} < 0$.

To confine the mode groups to the core, the trench cannot be too far away from the core. Usually, a value range of $R_{IC}$ is $0 \leq R_{IC} \leq R_{CO}/2$. Considering a manufacturing process of the few mode fiber, a wider trench indicates higher drawing costs. Therefore, a value range of $R_{TR}$ is usually $0 \leq R_{TR} \leq R_{CO}$, and $R_{CL}$ is usually 62.5 µm.

Based on the foregoing calculations, it may be learned that the ranges of the parameters of the step-index few mode fiber are as follows:

$1.4502 \leq n_{CO}(r) \leq 1.4514$;

$1.4434 \leq n_{CL} = n_{IC} \leq 1.4446$;

$-0.0045 \leq \Delta n_{TR} < 0$;

$0 \leq R_{IC} \leq R_{CO}/2$;

$0 > R_{TR} \leq R_{CO}$; and $R_{CL} = 62.5 \mu m$.

It should be noted that $R_{CO}$ may be determined based on the quantity of mode groups transmitted by the step-index few mode fiber. A largest error of a related refractive index parameter of the few mode fiber may be 1e-4, and a largest relative error of structure-related parameters $R_{CO}$, $R_{IC}$, and $R_{TR}$ is 2.5%.

For example, the quantity of mode groups transmitted by the few mode fiber is M=3. It may be determined (through, for example, table lookup) that a range of the corresponding normalized frequency parameter V is $3.8 \leq V \leq 5.1$. That is, there is a correspondence between the quantity of mode groups transmitted by the few mode fiber and the normalized frequency parameter. Further, optionally, a range of $R_{CO}$ may be determined according to $V=2\pi R_{CO}NA/\lambda$. It should be noted that, it is found, through simulation, that the range of R has relatively small impact on a simulation result. To reduce simulation complexity, a median value in the range of $R_{CO}$ may be used, for example, an average value of a largest value and a smallest value in the range of $R_{CO}$ may be used, that is, $R_{co}=8.5$ µm. Further, optionally, $1.4502 \leq n_{CO}(r) \leq 1.4514$ may be determined according to $$NA = \sqrt[2]{n_{CO}^2 - n_{CL}^2}.$$

Further, because $0 \leq R_{IC} \leq R_{CO}/2$, $0 < R_{IC} \leq 4.25$ µm is obtained. Because a value range of $R_{TR}$ is $0 \leq R_{TR} \leq R_{CO}$, $0 < R_{TR} \leq 8.5$ µm is obtained.

Based on the foregoing calculations, it may be learned that when the quantity of mode groups transmitted by the step-index few mode fiber is 3, the ranges of the parameters of the step-index few mode fiber are as follows:

$1.4502 \leq n_{CO}(r) \leq 1.4514$;

$1.4434 \leq n_{CL} = n_{IC} \leq 1.4446$;

$-0.0045 \leq \Delta n_{TR} < 0$;

$R_{CO} = 8.5$ µm;

$0 < R_{IC} \leq 4.25$ µm;

$0 < R_{TR} \leq 8.5$ µm; and $R_{CL} = 62.5$ µm.

In a possible implementation, after three mode groups are transmitted by using a few mode fiber of a span whose length is L, group delays are respectively $t_1 = L/v_1 = L \cdot n_{g_1}/c$, $t_2 = L/v_2 = L \cdot n_{g_2}/c$, and $t_3 = l/v_3 = L \cdot n_{g_3}/c$, where $n_{g_1}$, $n_{g_2}$, and $n_{g_3}$ are respectively group refractive indexes corresponding to the mode groups, and c is a speed of light in a vacuum. Therefore, it can be determined that the group delays of the mode groups during transmission in the few mode fiber are directly proportional to the group refractive indexes of the mode groups. For example, group delays of M mode groups are respectively $t_1, t_2, \ldots, t_{M-1}$, and $t_M$, and group refractive indexes of the M mode groups are respectively $n_{g_1}$, $n_{g_2}, \ldots, n_{g_{M-1}}$, and $n_{g_M}$. To meet $t_1 + t_M = t_2 + t_{M-1} = \ldots$, $n_{g_1} + n_{g_M} = n_{g_2} + n_{g_{M-1}} = \ldots$ is required. Further, optionally, a group refractive index and an effective refractive index of the mode group meet: $n_{gi} = n_{effi} - \lambda (dn_{effi}/d\lambda)$, where $n_{gi}$ represents a group refractive index of an $i^{th}$ mode group, and $n_{effi}$ represents an effective refractive index of the $i^{th}$ mode group.

Corresponding parameters that are of the step-index few mode fiber and that are obtained when the group refractive indexes of the M mode groups are symmetrically distributed about the center may be determined by performing joint simulation by using simulation software COMSOL and MATLAB based on the ranges of the parameters of the step-index few mode fiber.

In a possible implementation, the radius $R_{CO}$ of the core, the refractive index $n_{CO}$ of the core, the width $R_{IC}$ of the inner cladding, the refractive index $n_{IC}$ of the inner cladding, the width $R_{TR}$ of the trench, and the relative refractive index difference $\Delta n_{TR}$ between the trench and the outer cladding may be comprehensively scanned, to obtain relationships between the parameters of the few mode fiber and M effective refractive indexes. Further, relationships between the parameters of the few mode fiber and the M group refractive indexes may be determined based on the relationship between an effective refractive index of a mode group and a group refractive index of the mode group. For example, one of the parameters may be used as a variable, and a scanning step is 0.1 µm, to separately determine the group refractive indexes of the M mode groups.

As shown in Table 1, based on a group of parameters $\{n_{CO}, n_{CL}, n_{IC}, \Delta n_{TR}, R_{CO}, R_{IC}, R_{TR}\}$ of the few mode fiber, the M effective refractive indexes may be determined, and further, the M group refractive indexes may be determined.

TABLE 1

Parameters of the few mode fiber, effective refractive index of a mode group, and refractive index of the mode group

| $n_{CO}$ | $n_{CL}$ | $n_{IC}$ | $\Delta n_{TR}$ | $R_{CO}$ | $R_{IC}$ | $R_{TR}$ | $n_{effi}$, where i is 1 to M | $n_{gi}$, where i is 1 to M |
|---|---|---|---|---|---|---|---|---|

Based on the foregoing Table 1, corresponding parameters $\{n_{CO}, n_{CL}, n_{IC}, \Delta n_{TR}, R_{CO}, R_{IC}, R_{TR}\}$ that are of the few mode fiber and that meet $n_{g_1} + n_{g_M} = n_{g_2} + n_{g_{M-1}} \ldots$ are determined as parameters for implementing symmetric distribution, of the group delays of the M mode groups transmitted in the few mode fiber, about the center.

For example, the mode groups transmitted by the step-index few mode fiber are $LP_{01}$, $LP_{11}$, and $LP_{21}$. It may be determined, through simulation, that when the parameters of the step-index few mode fiber are $N_{CO}(r)=1.45$, $n_{CL}=n_{IC}=1.444$, $R_{CO}=8.5$ μm, $R_{IC}=1$ μm, $R_{TR}=4$ μm, and $\Delta n_{TR}=-0.001$, group refractive indexes of the three mode groups meet $n_{g_1}+n_{g_3}=2n_{g_2}$. To be specific, group delays of the three mode groups meet $t_1+t_3=2\ t_2$, that is, the group delays of the three mode groups are symmetrically distributed about a center.

Figure 4B:
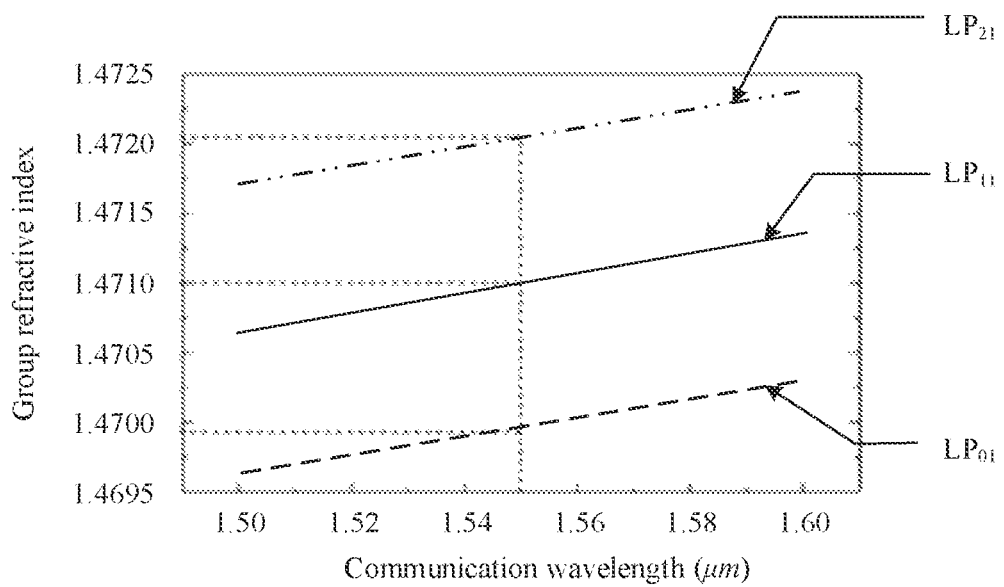
FIG. 4b is a schematic diagram of a group refractive index profile of a step-index few mode fiber according to this application.

FIG. 4b is a schematic diagram of group refractive index profiles, of mode groups $LP_{01}$, $LP_{11}$, and $LP_{21}$ that are transmitted by a step-index few mode fiber, in a communication wavelength range of 1.5 μm to 1.6 μm according to this application. Group refractive indexes of the three mode groups shown in FIG. 4b are determined based on effective refractive indexes obtained by performing joint simulation by using COMSOL and MATLAB. It may be determined from FIG. 4b that the group refractive indexes of the three mode groups $LP_{01}$, $L_{11}$, and $LP_{21}$ all increase as a communication wavelength increases, and change in a same trend. Group refractive indexes, group velocities, and group delays of the three mode groups ($LP_{01}$, $LP_{11}$, and $LP_{21}$) at $\lambda=1.55$ μm are respectively shown in Table 2. A group refractive index of $LP_{01}$ is 1.46993, and a group delay of $LP_{01}$ is 0. A group refractive index of $LP_{11}$ is 1.47100, and a group delay of $L_{11}$ is 3.5200 ps/m. A group refractive index of $LP_{21}$ is 1.47204, and a group delay of $LP_{21}$ is 7.0431 ps/m. Therefore, it can be determined that the group refractive indexes of $LP_{01}$, $LP_{11}$, and $LP_{21}$ are symmetrically distributed about a center, that is, $1.46993+1.47204 \approx 2*1.47100$; and the group delays of $LP_{01}$, $LP_{11}$, and $LP_{21}$ are also symmetrically distributed about a center, that is, $2*3.5200 \approx 0+7.0431$.

TABLE 2

Group refractive indexes, group velocities, and group delays of three mode groups $LP_{01}$, $LP_{11}$, and $LP_{21}$ at $\lambda = 1.55$ μm

| Mode | $LP_{01}$ | $LP_{11}$ | $LP_{21}$ |
| --- | --- | --- | --- |
| Group refractive | 1.46993 | 1.47100 | 1.47204 |
| Group velocity (m/s) | $2.0410 \times 10^8$ | $2.0394 \times 10^8$ | $2.380 \times 10^8$ |
| DMGD (ps/m) | 0 | 3.5200 | 7.0431 |

Figure 4C:
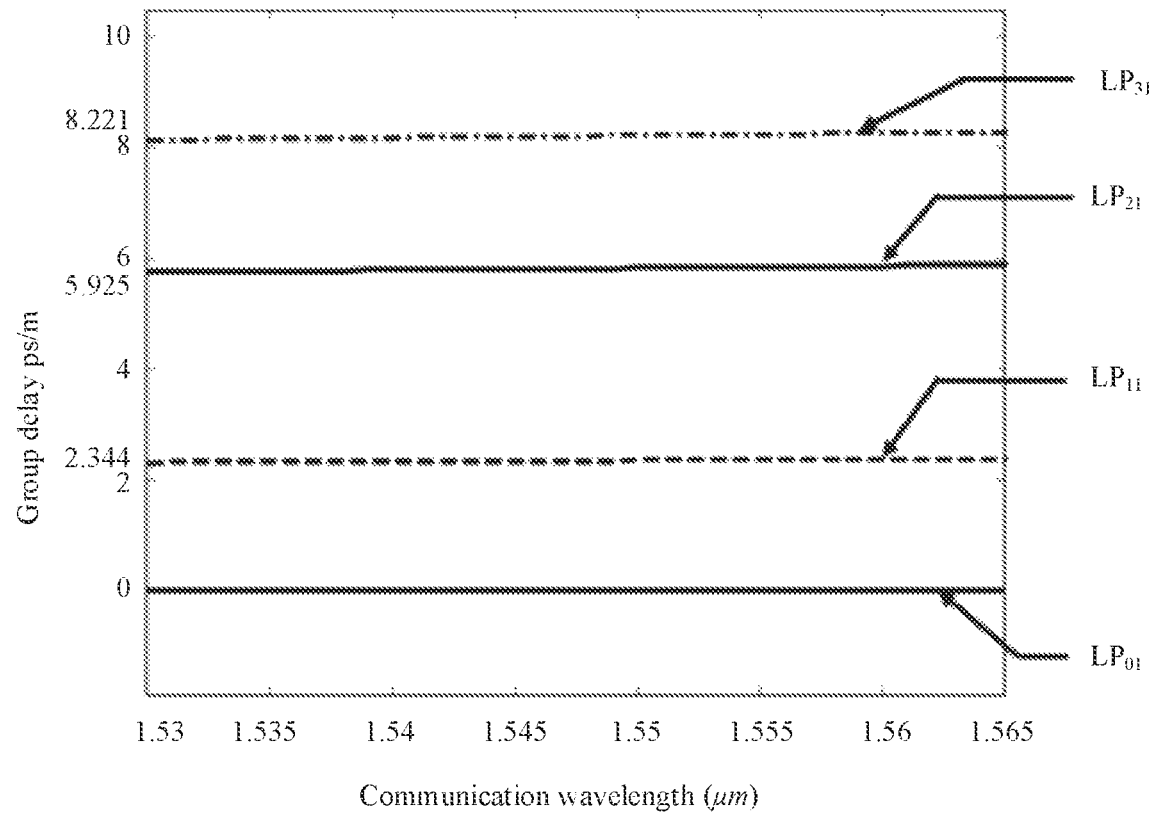
FIG. 4c is a schematic diagram of a group refractive index profile of another step-index few mode fiber according to this application.

In a possible implementation, the M group delays symmetrically distributed about the center may be in an equal-difference relationship (as shown in Table 2), or may not be in an equal-difference relationship. To design the group delays of the M mode groups during transmission in the few mode fiber to meet the equal-difference relationship, a previous mode group needs to be subtracted from each of the M mode groups, to determine whether the equal-difference relationship is met. On one hand, a simulation process for determining refractive index profiles and structure parameters of the few mode fiber is relatively complex. On the other hand, manufacturing costs of the few mode fiber are relatively high. To reduce manufacturing costs and simulation complexity of the few mode fiber, the few mode fiber may be designed as follows: The group delays of the M mode groups transmitted in the few mode fiber are symmetrically distributed about the center without an equal difference. The following shows, as an example, refractive index profiles and structure parameters of a step-index few mode fiber, so that M group delays corresponding to M mode groups transmitted in the step-index few mode fiber can be symmetrically distributed about a center without an equal difference. For example, the step-index few mode fiber transmits four mode groups ($LP_{01}$, $LP_{11}$, $LP_{02}$, and $LP_{31}$). Based on the foregoing same process, parameters of the step-index few mode fiber are $n_{CO}(r)=1.45$, $n_{CL}=n_{IC}=1.444$, $\Delta n_{TR}=0$, $R_{CO}=11.9$ μm, $R_{IC}=0$ μm, and $R_{TR}=0$ μm, so that group delays of $LP_{01}$, $LP_{11}$, $LP_{02}$, and $LP_{31}$ during transmission in the step-index few mode fiber can be symmetrically distributed about a center without an equal difference. Referring to FIG. 4c, when $\lambda$ is in a range of 1.530 μm to 1.565 μm, a group delay of $LP_{01}$ is 0, a group delay of $LP_{11}$ is 2.344 ps/m, a group delay of $LP_{02}$ is 5.925 ps/m, and a group delay of $LP_{31}$ is 8.221 pr/m.

Type 2. Graded-Index Few Mode Fiber.

Figure 5A:
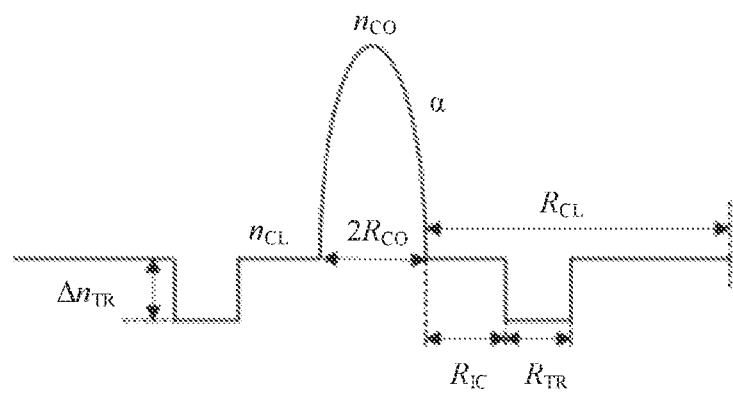
FIG. 5a is a schematic diagram of a structure of a graded-index few mode fiber according to this application.

FIG. 5a is a schematic diagram of a structure of a graded-index few mode fiber according to this application. A refractive index profile function of the graded-index few mode fiber is as follows:

$$n(r) = \begin{cases} n_{CO}\left[1 - \Delta n_{CO}\left(\dfrac{r}{R_{CO}}\right)^{\alpha}\right] & 0 < r \leq R_{CO} \\ n_{IC} & R_{CO} < r \leq R_{CO} + R_{IC} \\ \dfrac{n_{CL}}{1 - \Delta n_{TR}} & R_{CO} + R_{IC} < r \leq R_{CO} + R_{IC} + R_{TR} \\ n_{CL} & R_{CO} + R_{IC} + R_{TR} < r \leq R_{CL} \end{cases},$$

where $\Delta n_{CO}$ represents a relative refractive index between a core and outer cladding, $\Delta n_{CO}=(n_{CO}-n_{CL})/n_{CO}$, and $\alpha$ is a refractive index profile shape index, is an empirical value, and has a value range of $2\pm0.5$. $n_{CO}$ represents a refractive index of the core, $n_{IC}$ represents a refractive index of inner cladding, $n_{CL}$ represents a refractive index of the outer cladding, $$\dfrac{n_{CL}}{1 - \Delta n_{TR}}$$

represents a retractive index of a trench, $\Delta n_{TR}$ represents a relative refractive index difference between the trench and the outer cladding, $\Delta n_{TR}=(n_{TR}-n_{CL})/n_{CL}$, $R_{CO}$ represents a radius of the core, $R_{IC}$ represents a width of the inner cladding, $R_{TR}$ represents a width of the trench, and $R_{CL}$ represents a width of the outer cladding.

For example, a quantity of mode groups transmitted by the graded-index few mode fiber is M=3. Referring to the foregoing process of calculating the parameters of the step-index few mode fiber, it may be determined that ranges of parameters of the graded-index few mode fiber are as follows:

$1.4502 \leq n_{CO}(r) \leq 1.4514$;

$1.4434 \leq n_{CL}=n_{IC} \leq 1.4446$;

$-0.0045 \leq \Delta n_{TR} < 0$;

$R_{CO}=14.2$ μm;

$1.5 \leq \alpha \leq 2.5$;

$0 < R_{IC} \leq 7.1$ μm;

$0 < R_{TR} \leq 14.2$ μm; and $R_{CL}=62.5$ μm.

Corresponding parameters that are of the graded-index few mode fiber and that are obtained when group refractive indexes of M mode groups are symmetrically distributed about a center may be determined by performing joint simulation by using simulation software COMSOL and MATLAB based on the ranges of the parameters of the graded-index few mode fiber. For a specific process, refer to the foregoing descriptions of the step-index few mode fiber. Details are not described one by one herein again. Corresponding parameters that are of the few mode fiber and that meet $n_{g_1}+n_{g_M}=n_{g_2}+n_{g_{M-1}}= \ldots$ may be determined as the parameters of the graded-index few mode fiber.

For example, the mode groups transmitted by the graded-index few mode fiber are $LP_{01}$, $LP_{11}$, and $LP_{21}$. It may be determined, through simulation, that when the parameters of the graded-index few mode fiber are $n_{CO}(r)=1.45$, $n_{CL}=n_{IC}=1.444$, $R_{CO}=14.2$ μm, $R_{IC}=1$ μm, $R_{TR}=1$ μm, $\alpha=2.3$, and $\Delta n_{TR}=-0.0045$, group refractive indexes of the three mode groups meet $n_{g_1}+n_{g_3}=2n_{g_2}$. To be specific, group delays of the three mode groups meet $t_1+t_3=2t_2$, that is, the group delays of the three mode groups are symmetrically distributed about a center.

Figure 5B:
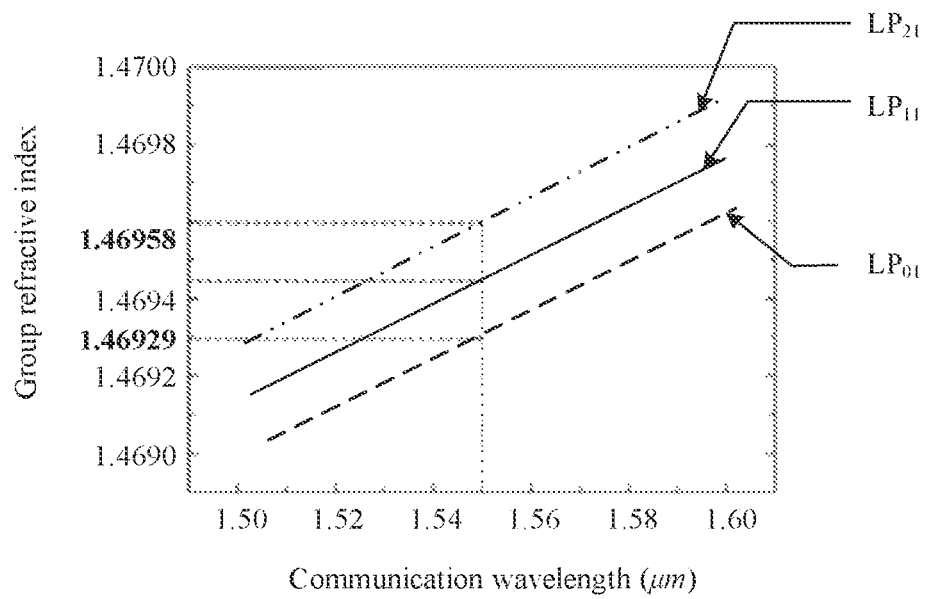
FIG. 5b is a schematic diagram of a group refractive index profile of a graded-index few mode fiber according to this application.

FIG. 5b is a schematic diagram of group refractive index profiles, of mode groups $LP_{01}$, $LP_{11}$, and $LP_{21}$ that are transmitted by a graded-index few mode fiber, in a range of 1.5 μm and 1.6 μm according to this application. Group refractive indexes of the three mode groups shown in FIG. 5b are determined based on effective refractive indexes obtained by performing joint simulation by using COMSOL and MATLAB, It may be seen from FIG. 5b that the group refractive indexes of the three mode groups $LP_{01}$, $LP_{11}$, and $LP_{21}$ all increase as a wavelength increases, and change in a same trend. Group refractive indexes, group velocities, and group delays of the three mode groups $LP_{01}$, $LP_{11}$, and $LP_{21}$ at $\lambda=1.55$ μm are shown in Table 3. A group refractive index of $LP_{01}$ is 1.46929, and a group delay of $LP_{01}$ is 0. A group refractive index of $LP_{11}$ is 1.46944, and a group delay of $LP_{11}$ is 0.49176 ps/m. A group refractive index of LP21 is 146958, and a group delay of $LP_{21}$ is 0.98218 ps/m. It can be determined that the group refractive indexes of $LP_{01}$, $LP_{11}$, and $LP_{21}$ are symmetrically distributed about a center, that is, $1.46929+1.46958≈2*1.46944$; and the group delays of $LP_{01}$, $LP_{11}$, and $LP_{21}$ are also symmetrically distributed about a center, that is $2*0.49176≈0.98218$.

TABLE 3

Group refractive indexes, group velocities, and group delays of three mode groups $LP_{01}$, $LP_{11}$, and $LP_{21}$ at $\lambda = 1.55$ μm

| Mode | $LP_{01}$ | $LP_{11}$ | $LP_{21}$ |
| --- | --- | --- | --- |
| Group refractive | 1.46929 | 1.46944 | 1.46958 |
| Group velocity (m/s) | $2.0418 \times 10^8$ | $2.04159 \times 10^8$ | $2.04140 \times 10^8$ |
| DMGD (ps/m) | 0 | 0.49176 | 0.98218 |

Figure 5C:
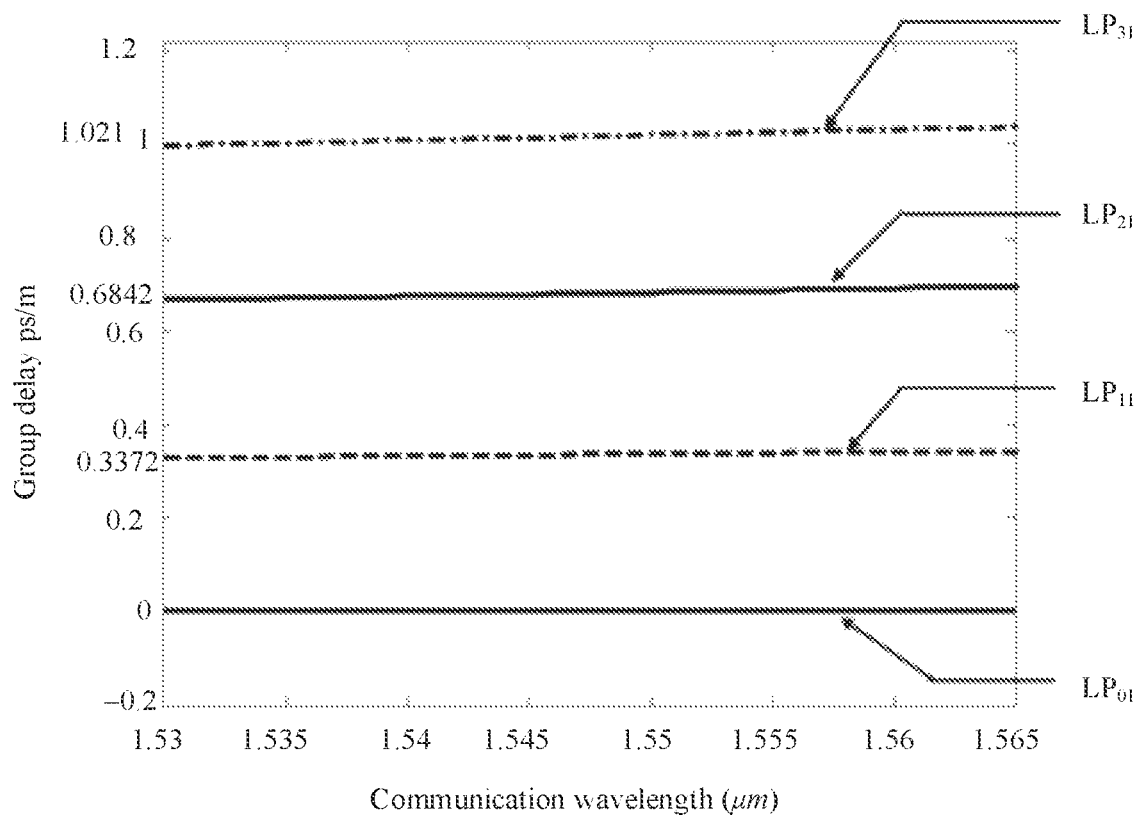
FIG. 5c is a schematic diagram of a group refractive index profile of another graded-index few mode fiber according to this application.

To reduce manufacturing costs and simulation complexity of the few mode fiber, the few mode fiber may be designed as follows: The group delays of the M mode groups transmitted in the few mode fiber are symmetrically distributed about the center without an equal difference. The following shows, as an example, refractive index profiles and structure parameters of a graded-index few mode fiber, so that M groups corresponding to M mode groups transmitted in the graded-index few mode fiber can be symmetrically distributed about a center without an equal difference. For example, the graded-index few mode fiber transmits four mode groups ($LP_{01}$, $LP_{11}$, $LP_{02}$, and $LP_{31}$). Based on the foregoing same process, parameters of the graded-index few mode fiber are $n_{CO}(r)=1.45$, $n_{CL}=n_{IC}=1.444$, $R_{CO}=19.6$ μm, $R_{IC}=2$ μm, $R_{TR}=1$ μm, $\alpha=2.3$ and $\Delta n_{TR}=-0.0045$, so that group delays of $LP_{01}$, $LP_{11}$, $LP_{02}$, and $LP_{31}$ during transmission in the graded-index few mode fiber can be symmetrically distributed about a center without an equal difference. Referring to FIG. 5c, when $\lambda$ is in a range of 1.530 μm to 1.565 μm, a group delay of $LP_{01}$ is 0, a group delay of $LP_{11}$ is 0.3372 ps/m, a group delay of $LP_{02}$ is 0.6842 ps/m, and a group delay of $LP_{31}$ is 1,021 ps/m.

2. Mode Converter

In this application, the mode converter is configured to implement conversion between different mode groups, that is, can implement conversion from a mode group to another mode group. The mode converter may be configured to exchange the first mode group and the second mode group that are in the M received mode groups and whose group delays are symmetric about the center. That is, the mode converter may exchange a mode group with a highest transmission speed (a smallest group delay) and a mode group with a lowest transmission speed (a largest group delay), that is, $(v_{g_M} \leftrightarrow v_{g_1})$; exchange a mode group with a second highest transmission speed (a second smallest group delay) and a mode group with a second lowest transmission speed (a second largest group delay), that is, $(v_{g_M} \leftrightarrow v_{g_1})$; and so on. For example, the group delays of the M mode groups are respectively $t_1, t_2, \ldots, t_{M-1}$, and $t_M$, where $t_1$ and $t_M$ are symmetric about the center, t2 and $t_{M-1}$ are symmetric about the center, and so on. Therefore, the mode converter may exchange a mode group corresponding to $t_1$ and a, mode group corresponding, to $t_M$, that is, convert the mode group corresponding to $t_1$ into the mode group corresponding to $t_M$, and convert the mode group corresponding to $t_M$ into the mode group corresponding to $t_1$; and convert a mode group corresponding to $t_2$ into a mode group corresponding to $t_{M-1}$, and convert the mode group corresponding to $t_{M-1}$ into the mode group corresponding to $t_2$.

For example, if the mode group corresponding to $t_1$ carries a signal 1, the mode group corresponding to $t_M$ carries a signal 2, after the mode group corresponding to $t_1$ is converted into the mode group corresponding to $t_M$, and the mode group corresponding to $t_M$ is converted into the mode group corresponding to $t_1$, the signal 1 is carried in the mode group corresponding to $t_M$, and the signal 2 is carried in the mode group corresponding to $t_1$.

In a possible implementation, the mode converter may receive an optical signal from the few mode fiber, and the optical signal includes M mode groups. That is, an optical signal is input to the mode converter, and an optical signal is also output from the output mode converter, In this application, the mode converter may be implemented based on a multi-plane light conversion principle, for example, a mode converter that is based on a phase plate, a mode converter that is based on spatial optical modulation, or a mode converter that is based on a metasurface structure. Alternatively, the mode converter may be implemented based on a waveguide mode coupling theory, for example, a mode converter that is based on a fiber grating, or a mode converter that is based on a fiber coupler. The following provides detailed descriptions by using the mode converter that is based on a phase plate and the mode converter that is based on a fiber grating as examples.

Structure 1. Mode converter that is based on a fiber grating

The fiber grating may be considered as a fiber whose core refractive index periodically changes. Usually, the fiber grating is made of a fiber having a photosensitive core, and a refractive index of outer cladding of the fiber does not change. It should be understood that, when the fiber grating is used as a mode converter, a period of the fiber grating is relatively long, and therefore the mode converter is also referred to as a mode converter that is based on a long-period fiber grating.

The fiber grating can implement coupling between mode groups. If two mode groups meet a phase matching condition on a communication wavelength, mode group conversion can be performed between the two mode groups. The phase matching condition is: $\lambda = \Delta n_{eff} * \forall$, where $\lambda$ is the communication wavelength, $\forall$ is a period of the fiber grating, $\Delta n_{eff} = n_{eff1} - n_{eff2}$, $\Delta n_{eff1}$ is an effective refractive index of a first mode group, and $n_{eff2}$ is an effective refractive index of a second mode group. That is, when the first mode group and the second mode group pass through the fiber grating of this period, the first mode group and the second mode group may be mutually converted. For example, when the communication wavelength is $\lambda = 1.55$ μm, $\forall = 290.5$ μm, and a length of the fiber grating is $L=24.9$ mm, the foregoing three mode groups $LP_{01}$, $LP_{11}$, and $LP_{21}$ are input. After $LP_{01}$, $LP_{11}$, and $LP_{21}$ enter the fiber grating, a mode field of $LP_{01}$ gradually changes, and finally, $LP_{01}$ may be converted into $LP_{21}$ at the other end of the fiber grating. Correspondingly, a mode field of $LP_{21}$ also gradually changes, and finally, $LP_{21}$ may be converted to $LP_{01}$ at the other end of the fiber grating.

In this application, to exchange the first anode group and the second mode group that are in the M mode groups and whose group delays are symmetric about the center, the mode converter may include fiber gratings of $\lfloor M/2 \rfloor$ different periods, where $\lfloor \ \rfloor$ indicates rounding down. One period corresponds to one first mode group and one second mode group, that is, one period corresponds to one pair of mode groups whose group delays are symmetric about the center.

Further, optionally, the first mode group and the second mode group that are in the M mode groups and that are symmetric about the center may be exchanged by controlling a period of each fiber grating. For example, the group delays of the M mode groups are respectively $t_1$, $t_2$, $t_{M-1}$, and $t_M$, where $t_1$ and $t_M$ are symmetric about the center, $t_2$ and $t_{M-1}$ are symmetric about the center, and so on. A period of a fiber grating for exchanging a mode group corresponding to $t_1$ and a mode group corresponding to $t_M$ is $\forall_1$, a period of a fiber grating for exchanging a mode group corresponding to $t2$ and a mode group corresponding to $t_{M-1}$ is $\forall_2$, and so on. $\forall_1 = \lambda/$(effective refractive index of the mode group corresponding to $t_1$–effective refractive index of the mode group corresponding to $t_M$), $\forall_2 = \lambda/$(effective refractive index of the mode group corresponding to $t_2$–effective refractive index of the mode group corresponding to $t_{M-1}$), and so on.

Further, optionally, when M is an even number, the M group delays include M/2 pairs of group delays symmetric about the center, that is, the M mode groups include M/2 first mode groups and M/2 second mode groups. The mode converter may exchange, in pairs, the first mode groups and the second mode groups that are in the M mode groups and whose group delays are symmetric about the center. When M is an odd number, the M group delays include $\lfloor M/2 \rfloor$ pairs of group delays symmetric about the center, that is, the M mode groups include $\lfloor M/2 \rfloor$ first mode groups, $\lfloor M/2 \rfloor$ second mode groups, and one independent mode group. The mode converter may exchange, in pairs, the first mode groups and the second mode groups that are in the M mode groups and whose group delays are symmetric about the center, and do not perform exchange on the independent mode group.

Figure 6A:
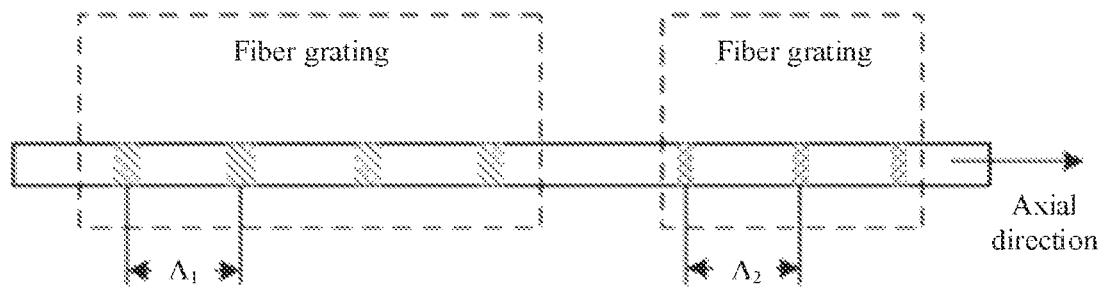
FIG. 6a is a schematic diagram of a cascaded structure of fiber gratings according to this application.
Figure 6B:
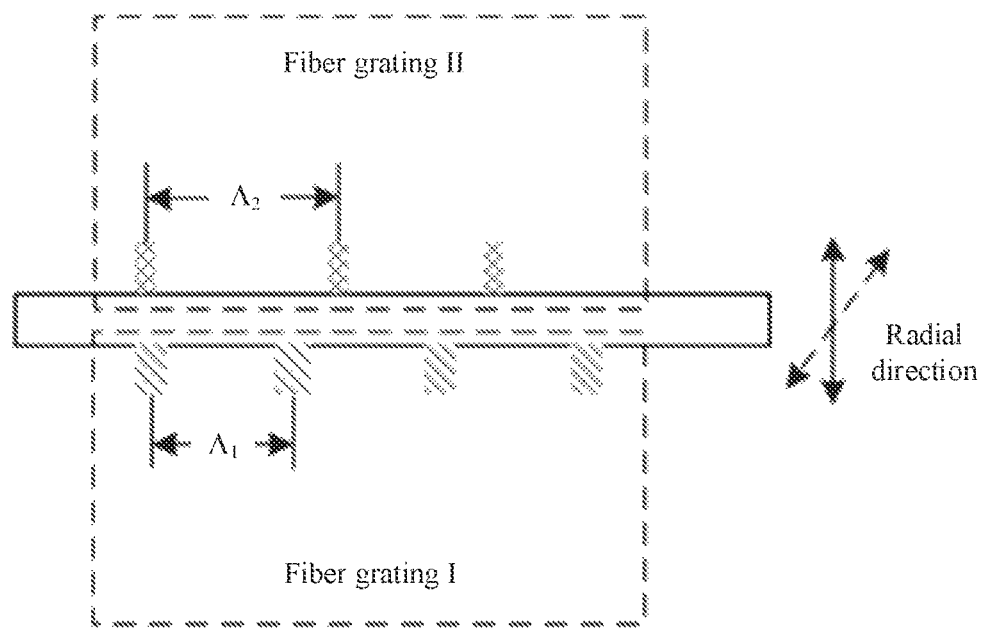
FIG. 6b is a schematic diagram of a stacked structure of fiber gratings according to this application.

In a possible implementation, the fiber gratings of the $\lfloor M/2 \rfloor$ different periods may be inscribed on the few mode fiber by using a carbon dioxide ($CO_2$) laser or a femtosecond laser. Further, optionally, the fiber gratings of the $\lfloor M/2 \rfloor$ different periods may be of a cascaded structure. Referring to FIG. 6a, two fiber gratings (a fiber grating I and a fiber grating II) are used as an example. Specifically, the fiber gratings of the $\lfloor M/2 \rfloor$ different periods may be sequentially inscribed in an axial direction of the few mode fiber. Alternatively, the fiber gratings of the M/2⌋ different periods may be of a stacked structure. Referring to FIG. 6b, two fiber gratings (a fiber grating I and a fiber grating II) are used as an example. Specifically, the fiber gratings of the $\lfloor M/2 \rfloor$ different periods may be inscribed at different angles of $\lfloor M/2 \rfloor$ radial directions (any directions perpendicular to the axial direction, where FIG. 6b shows two possible radial directions as examples) of the few mode fiber. The stacked structure helps avoid impact of cross sections of fiber gratings of different regions on coupling of other mode groups with unmatched phases. It should be noted that refractive index modulation of the stacked structure is approximately linear superposition of refractive index modulation of two fiber gratings, where a change amount of a refractive index of a core is as follows:

$$\Delta n(z) = \sum_{k=1}^{2} \overline{\Delta n_k}(z) + \overline{\Delta n_1}(z)\cos\left(\frac{2\pi}{\Lambda_1}z + \varphi_1(z)\right) + \overline{\Delta n_2}(z)\cos\left(\frac{2\pi}{\Lambda_2}z + \varphi_2(z)\right),$$

where
$\overline{\Delta n_k}(z)$ is an average refractive index change amount of a $k^{th}$ fiber grating, $\forall_1$ and $\forall_2$ are respectively periods of a fiber grating I and a fiber grating II, and $\varphi_1(z)$ and $\varphi_2(z)$ are respectively additional phases related to phase shift or chirp of the two fiber gratings.

In a possible implementation, a total length of each fiber grating is greater than a threshold, so that mode group conversion efficiency can be improved.

Structure 2. Mode converter that is based on a phase plate (or referred to as a phase sheet).

Figure 7A:
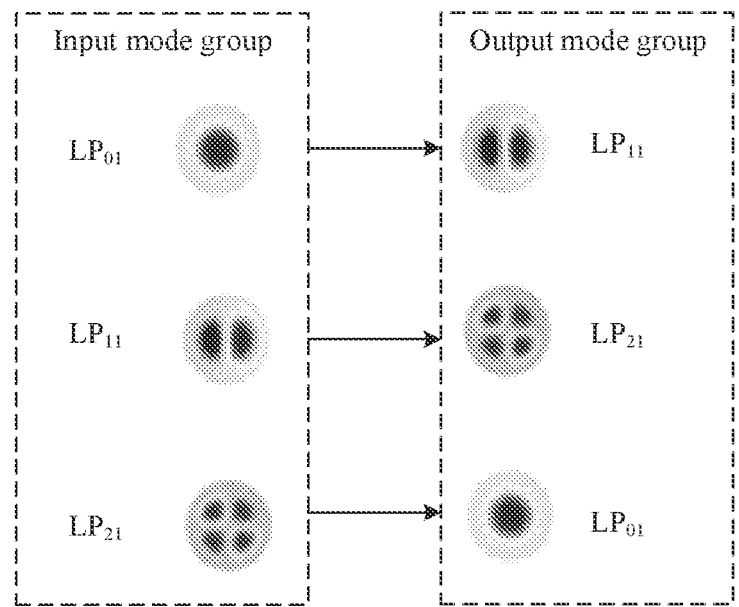
FIG. 7a is a schematic diagram of mode group conversion performed by a mode converter that is based on a phase plate according to this application.
Figure 7B:
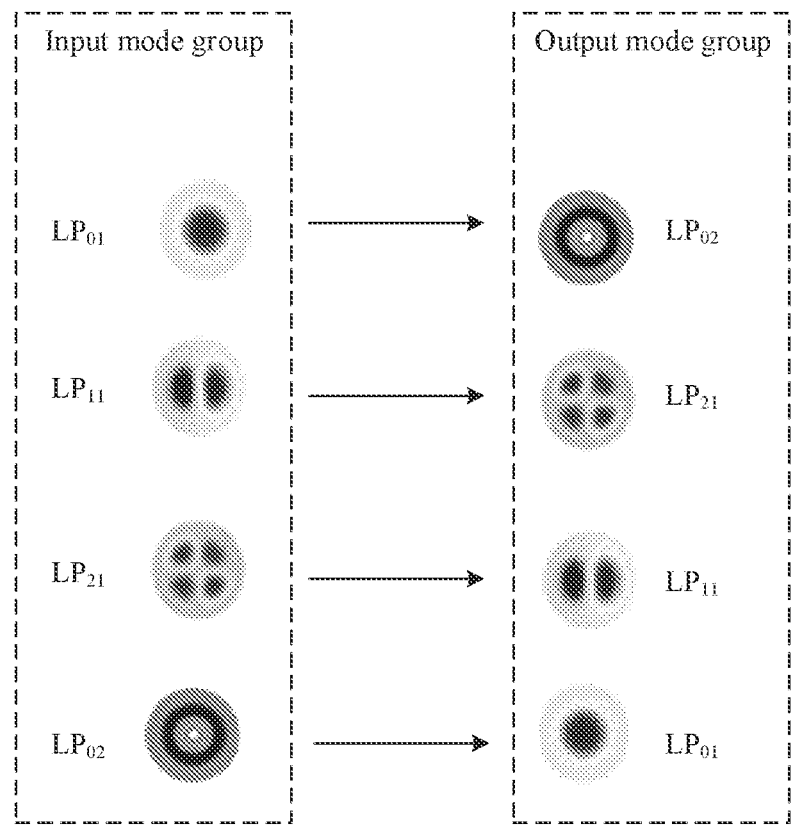
FIG. 7b is a schematic diagram of a structure of mode group conversion performed by another mode converter that is based on a phase plate according to this application.

The mode converter that is based on a phase plate is also referred to as a multi-plane light converter (multi-plane light conversion, MPLC). The phase plate means that a film layer with a specific thickness and refractive index is plated in a partial region (usually an annular band) on a glass plate or lens, so that a phase of light penetrating through the region is ahead of or behind a phase of light passing through a non-plated region. There are different pixels on each phase plate, and the pixels on the phase plate may introduce different phases, to modulate an incident light field, so that conversion between mode groups can be implemented. The mode converter that is based on a phase plate has a relatively strong control capability for a spatial light field, and theoretically, can complete conversion between any mode groups. For example, the mode converter that is based on a phase plate may implement round-robin mode group conversion. As shown in FIG. 7a, incident mode groups are sequentially $LP_{01}$, $LP_{11}$, and $LP_{21}$, and the incident mode groups are sequentially converted into $LP_{11}$, $LP_{21}$, and $LPL_{01}$. For another example, the mode converter that is based on a phase plate may exchange mode groups whose group delays are symmetric about a center. As shown in FIG. 7b, incident mode groups are sequentially $LP_{01}$, $LP_{11}$, $LP_{21}$, and $LPL_{02}$; and $LP_{01}$ and $LP_{02}$ can be exchanged, and $LP_{11}$ and $LP_{21}$ can be exchanged.

In a possible implementation, the mode converter may include a reflective phase plate or a transmissive phase plate. For example, the mode converter may include one or more transmissive phase plates, include at least upper and lower reflective phase plates, or include at least one reflective phase plate and at least one high reflector. The mode converter that is based on a phase plate may perform mode group exchange between a first mode group and a second mode group whose group delays are symmetric about a center. That is, an exchange policy of the mode converter that is based on a phase plate is exchanging a first mode group and a second mode group whose group delays are symmetric about a center. It should be understood that a larger quantity of phase plates included in the mode converter indicates higher phase adjustment fineness.

Figure 7C:
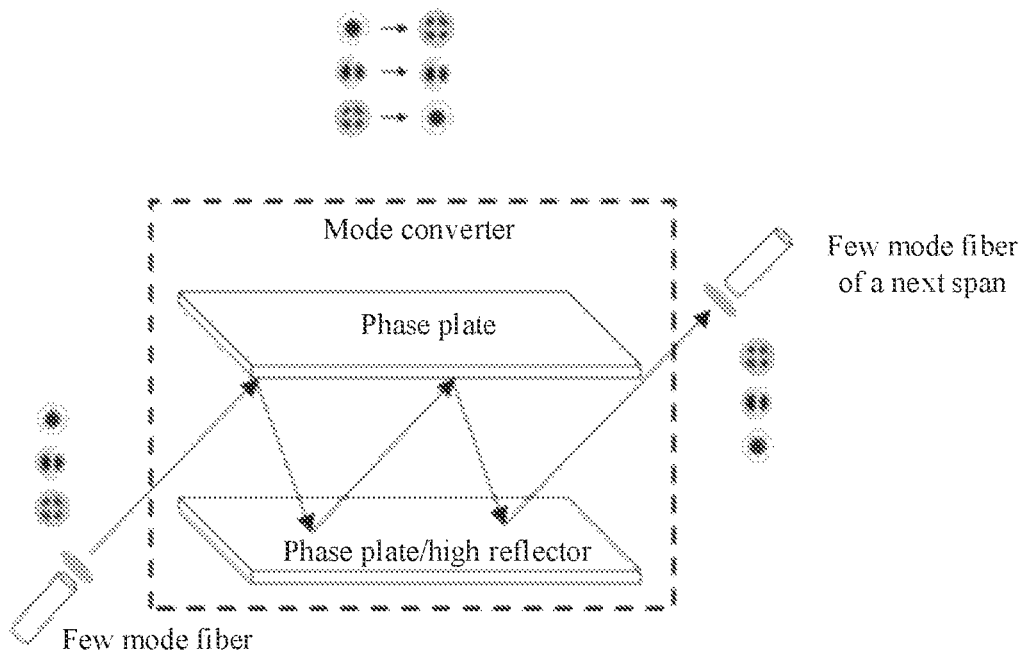
FIG. 7c is a schematic diagram of a structure of a mode converter that is a reflective phase plate according to this application.

FIG. 7c is a schematic diagram of a structure of a mode converter that is a reflective phase plate according to this application. In FIG. 7c, the mode converter may be two reflective phase plates, or may be a combination of one reflective phase plate and one high reflector. For example, the mode converter receives three mode groups ($LP_{01}$, $LP_{11}$, and $LP_{21}$). $LP_{01}$, $LP_{11}$, and $LP_{21}$ are reflected a plurality of times on the reflective phase plates, so that $LP_{01}$ is converted into $LP_{21}$, $LP_{21}$ is converted into $LP_{01}$, and $LP_{11}$ is not converted.

Figure 7D:
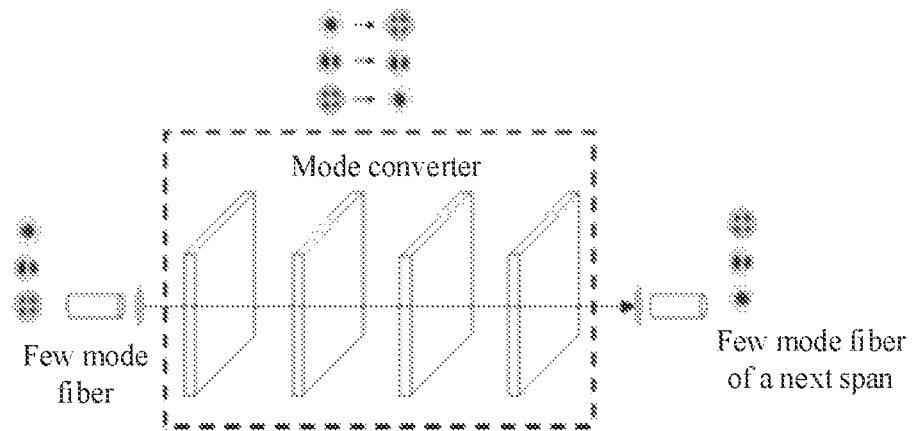
FIG. 7d is a schematic diagram of a structure of a mode converter that is a transmissive phase plate according to this application.

FIG. 7d is a schematic diagram of a structure of a mode converter that is a transmissive phase plate according to this application. In FIG. 7d, for example, the mode converter includes four transmissive phase plates. For example, the mode convener receives three mode groups ($LP_{01}$, $LP_{11}$, and $LP_{21}$). After $LP_{01}$, $LP_{11}$, and $LP_{21}$ sequentially pass through the four transmissive phase plates, $LP_{01}$ may be converted into $LP_{21}$, $LP_{21}$ may be converted into $LP_{01}$, and $LPL_{11}$ may not converted.

3. Amplifier

In this application, the communication system may further include an amplifier, and the amplifier is configured to amplify the M received mode groups. The amplifier may be a doped fiber amplifier.

In a possible implementation, the mode converter may include the following two position relationships with the amplifier.

Position relationship 1. The mode converter is located between the few mode fiber and the amplifier.

The following two cases may be obtained through classification based on the position relationship.

Figure 8A:
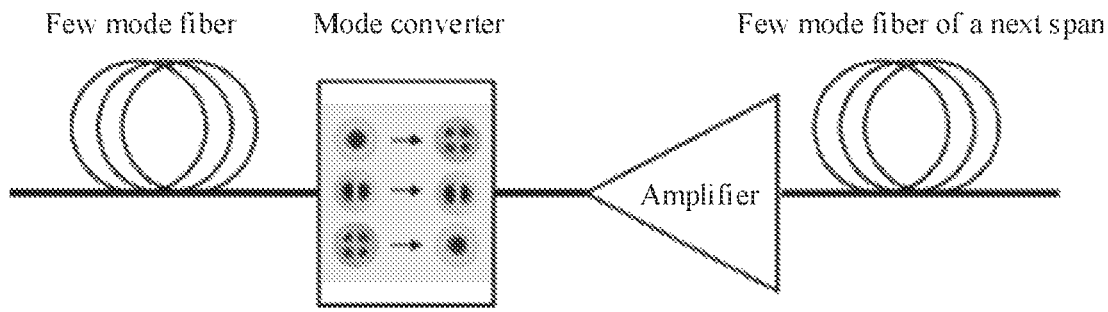
FIG. 8a is a schematic diagram of a position of a mode converter in a communication system according to this application.

Case 1. FIG. 8a is a schematic diagram of a position of a mode converter in a communication system according to this application. The mode converter may be behind a few mode fiber and in front of an amplifier.

Based on this case 1, the mode converter is configured to: convert a first mode group and a second mode group whose group delays are symmetrically distributed about a center, and transmit M converted mode groups to the amplifier. M mode groups obtained after the amplifier performs amplification conversion are transmitted to a few mode fiber of a next span.

Figure 8B:
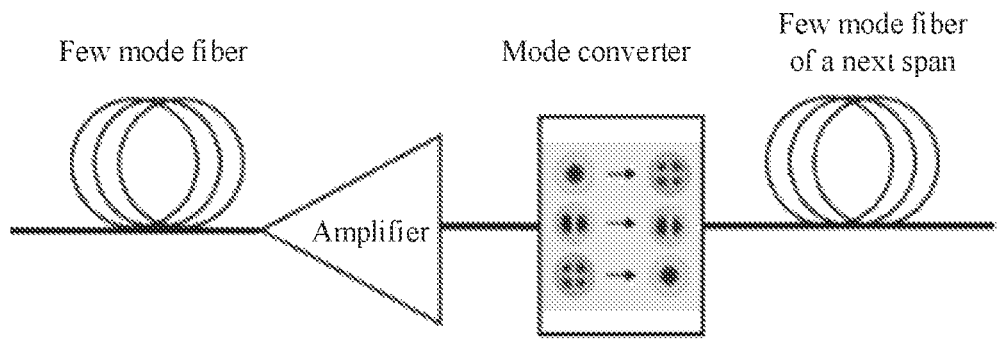
FIG. 8b is a schematic diagram of a position of another mode converter in a communication system according to this application.

Case 2. FIG. 8b is a schematic diagram of a position of another mode converter in a communication system according to this application. The mode converter is in front of a few mode fiber and behind an amplifier.

Based on this case 2, M mode groups obtained after the amplifier performs amplification enter the mode converter. The mode converter converts a first mode group and a second mode group that are in the amplified M mode groups and whose group delays are symmetric about a center, and transmits M converted mode groups to the few mode fiber of a next span.

Position relationship 2. The mode converter is integrated into the amplifier.

Figure 8C:
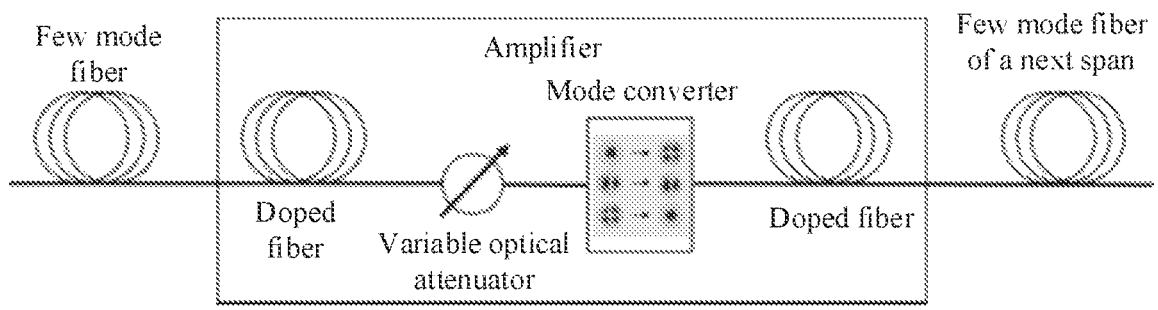
FIG. 8c is a schematic diagram of a position of still another mode converter in a communication system according to this application.

FIG. 8c is a schematic diagram of a position of still another mode converter in a communication system according to this application. The mode converter may be integrated into an amplifier. For example, the mode converter may be located between two doped (for example, erbium-doped) fibers. After M mode groups enter the amplifier, the M mode groups are amplified by using a first doped fiber, and then M amplified mode groups enter a variable optical attenuator (Variable Optical Attenuator, VOA), The M amplified mode groups are attenuated by using the VOA (to implement gain adjustability of the amplifier), and then M attenuated mode groups are transmitted to the mode converter. The mode converter converts a first mode group and a second mode group that are in the M mode groups and whose group delays are symmetrically distributed about a center, and transmits M converted mode groups to a second doped fiber. The M converted mode groups are amplified by using the second doped fiber, and then M amplified mode groups are coupled to a few mode fiber of a next span for continuous transmission. Because the mode converter has a specific insertion loss, integrating the mode converter into the amplifier can compensate for an insertion loss introduced by the mode converter without deteriorating a signal-to-noise ratio of signal transmission.

Based on the foregoing content, the following provides a specific implementation of the foregoing communication system with reference to a specific structure, to further understand the architecture of the foregoing communication system and the implementation process of reducing group delays of M mode groups received by a receive end.

Figure 9:
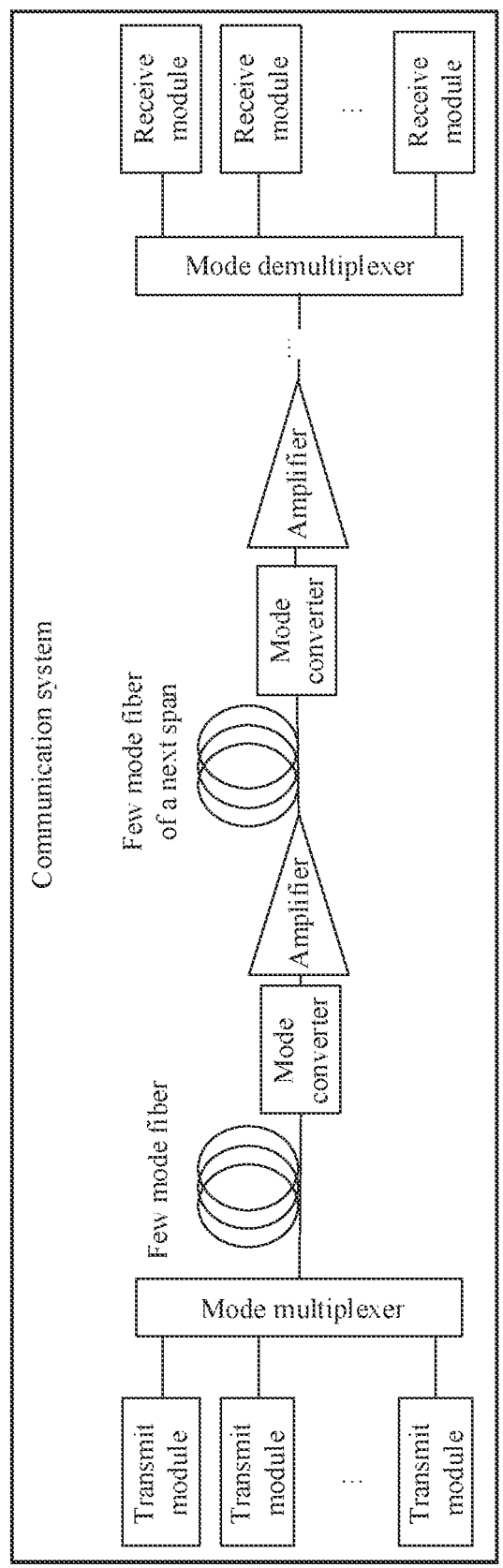
FIG. 9 is a schematic diagram of an architecture of another communication system according to this application.

FIG. 9 is a schematic diagram of an architecture of another communication system according to this application. The communication system may include a transmit module, a mode multiplexer, a few mode fiber, a mode converter, an amplifier, a mode demultiplexer, and a receive module. The transmit module may be M single mode transmit modules, and each single mode transmit module is configured to transmit one signal, to obtain M signals (for example, wavelength division signals), and transmit the M signals to the mode multiplexer. Each signal is carried by one specific mode group. The mode multiplexer is configured to: convert each signal from a fundamental mode into a different high-order mode group, multiplex M mode groups that carry different signals into one signal, and couple the multiplexed signal to the few mode fiber for transmission. For the few mode fiber, the mode converter, and the amplifier, refer to the foregoing descriptions of the few mode fiber, the mode converter, and the amplifier. Details are not described one by one herein again. The mode demultiplexer is configured to: split the received multiplexed signal into M mode groups that carry different signals, and transmit the M mode groups to the receive module. The receive module is configured to receive the M mode groups. For example, the receive module may include M single mode receive modules, and each single mode receive module may receive one corresponding mode group.

In a possible implementation, the transmit module may include a light source, and the light source may be configured to transmit optical signals of a same wavelength, or may be configured to transmit optical signals of different wavelengths. For example, each light source may include at least one laser, and the laser may transmit a signal in a wavelength range of 1.5 μm to 1.6 μm.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In the text descriptions of this application, the character "/" usually indicates an "or" relationship between associated objects. In the formula of this application, the character "/" indicates a "division" relationship between associated objects.

It can be understood that numerals used in this application are differentiated merely for ease of description, but are not used to limit the scope of the embodiments of this application. The sequence numbers of the foregoing processes do not mean an execution sequence, and the execution sequence of the processes should be determined according to functions and internal logic of the processes. The terms such as "first" and "second" are used to distinguish between similar objects instead of describing a specific sequence or order. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application.

Obviously, a person skilled in the art can make various modifications and variations to this application without departing from the spirit and scope of this application. In this way, this application is intended to cover these modifications and variations of the embodiments of this application provided that they fall within the scope of protection defined by the following claims and their equivalent technologies.

What is claimed is:

1. A communication system, comprising:
    a first few mode fiber of a first span, a second few mode fiber of a next span, and a mode converter, wherein the first few mode fiber is configured to transmit M received mode groups, group delays of the M mode groups during transmission in the first few mode fiber are symmetrically distributed about a center, the center of the group delays of the M mode groups is a median value between a largest value and a smallest value of the group delays of the M mode groups, a signal is carried in each of the M mode groups, and M is an integer greater than 1; and
    the mode converter is configured to: receive the M mode groups from the first few mode fiber, perform mode group exchange between a first mode group and a second mode group in the M mode groups to obtain M exchanged mode groups, and couple the M exchanged mode groups to the second few mode fiber of the next span, wherein a group delay of the first mode group and a group delay of the second mode group are symmetric about the center, and the M mode groups comprise the first mode group and the second mode group, wherein
    the first few mode fiber sequentially comprises a core, inner cladding, a trench, and outer cladding from inside to outside; and
    group refractive indexes of the M mode groups are symmetrically distributed about a center in the first few mode fiber, wherein
    a group refractive index of each of the M mode groups is determined based on an effective refractive index of the mode group, and the effective refractive index of the mode group is determined based on a refractive index of the core, a refractive index of the inner cladding, a refractive index of the outer cladding, a refractive index of the trench, a radius of the core, a width of the inner cladding, a width of the trench, and a width of the outer cladding of the first few mode fiber, and wherein
    the communication system further comprises an amplifier, wherein the mode converter is located between the first few mode fiber and the amplifier or the mode converter is integrated into the amplifier.

2. The communication system according to claim 1, wherein all pairs each comprising a first mode group and a second mode group that are in the M mode groups and whose group delays are symmetric about the center are equal in group delay sum.

3. The communication system according to claim 1, wherein the mode converter comprises fiber gratings of ⌊M/2⌋ different periods, one period corresponds to one first mode group and one second mode group, and ⌊ ⌋ indicates rounding down; and
    each of the ⌊M/2⌋ different periods is determined based on a communication wavelength, an effective refractive index of a corresponding first mode group, and an effective refractive index of a corresponding second mode group.

4. The communication system according to claim 3, wherein a difference that is between the effective refractive index of the first mode group corresponding to a grating period and the effective refractive index of the second mode group corresponding to the grating period and that is multiplied by the grating period is equal to the communication wavelength.

5. The communication system according to claim 3, wherein the fiber gratings of the ⌊M/2⌋ different periods are of a cascaded structure or a stacked structure.

6. The communication system according to claim 1, wherein the mode converter comprises a reflective phase plate or a transmissive phase plate.

7. A communication system, comprising:
    a first few mode fiber of a first span, a second few mode fiber of a next span, and a mode converter, wherein the first few mode fiber is configured to transmit M received mode groups, group delays of the M mode groups during transmission in the first few mode fiber are symmetrically distributed about a center, the center of the group delays of the M mode groups is a median value between a largest value and a smallest value of the group delays of the M mode groups, a signal is carried in each of the M mode groups, and M is an integer greater than 1;
    the mode converter is configured to: receive the M mode groups from the first few mode fiber, perform mode group exchange between a first mode group and a second mode group in the M mode groups to obtain M exchanged mode groups to the second few mode fiber of the next span, wherein a group delay of the first mode group and a group delay of the second mode group are symmetric about the center, and the M mode groups comprise the first mode group and the second mode group, wherein the first few mode fiber sequentially comprises a core, inner cladding, a trench, and outer cladding from inside to outside; and group refractive indexes of the M mode groups are symmetrically distributed about a center in the first few mode fiber, wherein a group refractive index of each of the M mode groups is determined based on an effective refractive index of the mode group, and the effective refractive index of the mode group is determined based on a refractive index of the core, a refractive index of the inner cladding, a refractive index of the outer cladding, a refractive index of the trench, a radius of the core, a width of the inner cladding, a width of the trench, and a width of the outer cladding of the first few mode fiber;

a transmitter configured to transmit optical signals to the first few mode fiber; and a receiver that is configured to receive optical signals from the second few mode fiber; and wherein the communication system further comprises an amplifier, wherein the mode converter is located between the first few mode fiber and the amplifier, or the mode converter is integrated into the amplifier.

8. The communication system according to claim 7, wherein all pairs each comprising a first mode group and a second mode group that are in the M mode groups and whose group delays are symmetric about the center are equal in group delay sum.

9. The communication system according to claim 7, wherein the mode converter comprises fiber gratings of $\lfloor M/2 \rfloor$ different periods, one period corresponds to one first mode group and one second mode group, and $\lfloor \ \rfloor$ indicates rounding down; and each of the $\lfloor M/2 \rfloor$ different periods is determined based on a communication wavelength, an effective refractive index of a corresponding first mode group, and an effective refractive index of a corresponding second mode group.

10. The communication system according to claim 9, wherein a difference that is between the effective refractive index of the first mode group corresponding to a grating period and the effective refractive index of the second mode group corresponding to the grating period and that is multiplied by the grating period is equal to the communication wavelength.

11. The communication system according to claim 9, wherein the fiber gratings of the $\lfloor M/2 \rfloor$ different periods are of a cascaded structure or a stacked structure.

12. The communication system according to claim 7, wherein the mode converter comprises a reflective phase plate or a transmissive phase plate.

13. A communication system, comprising:

a first few mode fiber of a first span, a second few mode fiber of a next span, and a mode converter, wherein the first few mode fiber is configured to transmit M received mode groups, group delays of the M mode groups during transmission in the first few mode fiber are symmetrically distributed about a center, the center of the group delays of the M mode groups is a median value between a largest value and a smallest value of the group delays of the M mode groups, a signal is carried in each of the M mode groups, and M is an integer greater than 1; and the mode converter is configured to: receive the M mode groups from the first few mode fiber, perform mode group exchange between a first mode group and a second mode group in the M mode groups to obtain M exchanged mode groups, and couple the M exchanged mode groups to the second few mode fiber of the next span, wherein a group delay of the first mode group and a group delay of the second mode group are symmetric about the center, and the M mode groups comprise the first mode group and the second mode group, wherein the first few mode fiber sequentially comprises a core, inner cladding, a trench, and outer cladding from inside to outside; and group refractive indexes of the M mode groups are symmetrically distributed about a center in the first few mode fiber, wherein a group refractive index of each of the M mode groups is determined based on an effective refractive index of the mode group, and the effective refractive index of the mode group is determined based on a refractive index of the core, a refractive index of the inner cladding, a refractive index of the outer cladding, a refractive index of the trench, a radius of the core, a width of the inner cladding, a width of the trench, and a width of the outer cladding of the first few mode fiber, and wherein the mode converter comprises fiber gratings of $\lfloor M/2 \rfloor$ different periods, one period corresponds to one first mode group and one second mode group, and $\lfloor \ \rfloor$ indicates rounding down; and each of the $\lfloor M/2 \rfloor$ different periods is determined based on a communication wavelength, an effective refractive index of a corresponding first mode group, and an effective refractive index of a corresponding second mode group.

14. The communication system according to claim 13, wherein all pairs each comprising a first mode group and a second mode group that are in the M mode groups and whose group delays are symmetric about the center are equal in group delay sum.

15. The communication system according to claim 13, wherein a difference that is between the effective refractive index of the first mode group corresponding to a grating period and the effective refractive index of the second mode group corresponding to the grating period and that is multiplied by the grating period is equal to the communication wavelength.

16. The communication system according to claim 13, wherein the fiber gratings of the $\lfloor M/2 \rfloor$ different periods are of a cascaded structure or a stacked structure.

17. The communication system according to claim 13, wherein the mode converter comprises a reflective phase plate or a transmissive phase plate.

* * * * *

UNITED STATES PATENT AND TRADEMARK OFFICE
CERTIFICATE OF CORRECTION

PATENT NO. : 12,197,008 B2
APPLICATION NO. : 17/854585
DATED : January 14, 2025
INVENTOR(S) : Qiang Guo et al.

It is certified that error appears in the above-identified patent and that said Letters Patent is hereby corrected as shown below:

In the Specification

In Column 1, In Line 6, Before "This" delete "100011".

Signed and Sealed this
Twenty-second Day of April, 2025

Coke Morgan Stewart
*Acting Director of the United States Patent and Trademark Office*